(12) United States Patent
Van Davelaar et al.

(10) Patent No.: US 6,168,400 B1
(45) Date of Patent: Jan. 2, 2001

(54) CHECK VALVE MODULE

(75) Inventors: Peter C. Van Davelaar, Maidens; Jeffrey A. Horsman; William Schnoebelen, both of Charlottesville, all of VA (US)

(73) Assignee: Dyax Corporation, Cambridge, MA (US)

( * ) Notice: Under 35 U.S.C. 154(b), the term of this patent shall be extended for 0 days.

(21) Appl. No.: 09/260,914

(22) Filed: Mar. 2, 1999

(51) Int. Cl.$^7$ .................................................. F16K 17/18
(52) U.S. Cl. ..................... 417/571; 137/454.2; 137/493.8
(58) Field of Search .................................... 417/569, 571; 137/454.2, 493.8

(56) References Cited

U.S. PATENT DOCUMENTS

| | | | | |
|---|---|---|---|---|
| 1,638,114 | * | 8/1927 | Dunlap et al. ........................ | 417/571 |
| 3,250,225 | * | 5/1966 | Taplin ................................... | 417/571 |
| 4,862,911 | * | 9/1989 | Yie ..................................... | 137/454.4 |
| 5,011,382 | * | 4/1991 | Thompson .......................... | 417/571 |

* cited by examiner

Primary Examiner—Stephen M. Hepperle
(74) Attorney, Agent, or Firm—Fish & Richardson P.C.

(57) ABSTRACT

A check valve module includes a body having a first fluid communicating surface and a second fluid communicating surface, and two one-way check valves in the body controlling flow between the first and second surfaces. One of the valves permits flow from the first surface to the second surface, and the other valve permits flow from the second surface to the first surface. The body also has an outer sealing surface between the first and second fluid communicating surfaces.

24 Claims, 4 Drawing Sheets

CHECK VALVE MODULE

BACKGROUND OF THE INVENTION

The invention relates to check valves.

Check valves are designed to control the direction of flow of a liquid or gas through a conduit. A typical check valve permits flow in one direction, but prohibits flow in an opposite direction.

SUMMARY OF THE INVENTION

In general, in one aspect, the invention features a check valve module including a body having a first fluid communicating surface and a second fluid communicating surface, and two one-way check valves in the body controlling flow between the first and second surfaces. One of the valves permits flow from the first surface to the second surface, and the other valve permits flow from the second surface to the first surface.

Embodiments of this aspect of the invention may include one or more of the following features. The module body has a first end and a second end. The first fluid communicating surface is on the first end, and the second fluid communicating surface is on the second end. The body also has an outer sealing surface between the first and second fluid communicating surfaces. The outer sealing surface is cylindrical, and has a sealing member, such as an O-ring. The first and second surfaces are circular.

The module includes an inlet and an outlet which communicate with the first fluid communicating surface. The inlet can, e.g., be larger than the outlet. The module also has a registration structure for aligning the inlet with an input flow assembly, and the outlet with an output flow assembly. The registration structure is, e.g., a threaded bore offset from the inlet and outlet. The threaded bore also communicates with the first fluid communicating surface.

The first fluid communicating surface is flat, and has a diameter greater than the diameter of the second fluid communicating surface.

Each one-way check valve in the module has a flow through channel which includes an upstream region, a downstream region, and a blocking structure. The blocking structure permits flow from the upstream region to the downstream region, but prohibits flow from the downstream region to the upstream region. The flow channel further includes a sealing structure, e.g., an inner O-ring, which forms a seal with the blocking structure to prohibit flow from the downstream region to the upstream region.

The blocking structure includes, e.g., a ball disposed within the downstream region. The ball has a diameter greater than the diameter of the inner O-ring, but less than the width of the downstream region. The ball forms a seal with the inner O-ring in the event of flow from the downstream region towards the upstream region. The blocking structure further includes a spring. The spring biases the ball towards the upstream region.

In general, in another aspect, the invention features a bi-directional flow-through assembly. The bi-directional flow-through assembly includes a flow-through conduit having an inner wall and a two-way check valve module disposed within the conduit. The two-way check valve includes a body having a first fluid communicating surface, a second fluid communicating surface, and an outer sealing surface for sealing the body to the inner wall of the conduit. In the body, two check valves control flow between the first and second surfaces. One check valve permits flow from the first surface to the second surface, and the other valve permits flow from the second surface to the first surface.

Embodiments of this aspect of the invention can include one or more of the following features. The outer sealing surface of the body includes an O-ring for forming a seal between the outer sealing surface and the inner wall of the conduit. The first fluid communicating surface has a width greater than the width of the conduit, such that the first fluid communicating surface remains outside of the conduit when the module is disposed within the conduit.

The assembly further includes a piston disposed within the conduit for pumping fluid through said module, and a top plate. The top plate has a first fluid communicating end and a second end for mating with the first surface of the check valve body. The first surface of the module has an inlet and an outlet, and the top plate has an inflow channel and an outflow channel for aligning with the inlet and the outlet. The first surface also has a threaded bore, and the top plate has a clearance hole for aligning with the threaded bore.

Embodiments of the invention have the advantage of including two one-way check valves in the same unitary piece, reducing the number of components needed for the flow assembly. The module is easy to replace, and does not require adjustment.

The registration structure for aligning the inlet with an input flow assembly prevents improperly connecting the input flow assembly to the outlet.

The module can be sealingly engaged to the interior of a rigid tubing, e.g., a cylinder of a positive displacement pump.

DESCRIPTION OF THE PREFERRED EMBODIMENTS

Figure 1A:
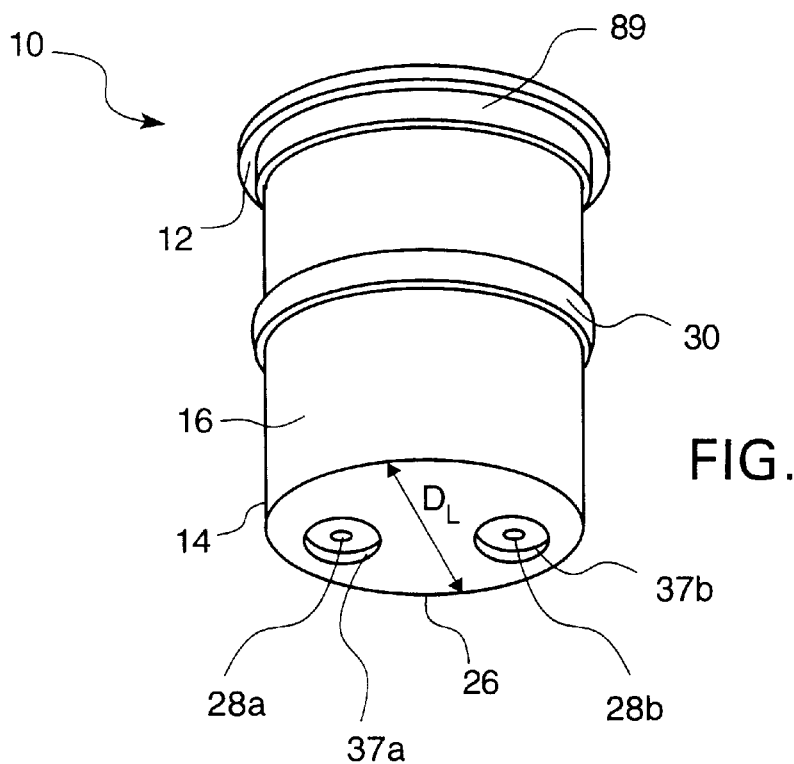
FIGS. 1A and 1B are perspective views of a check valve module.
Figure 1B:
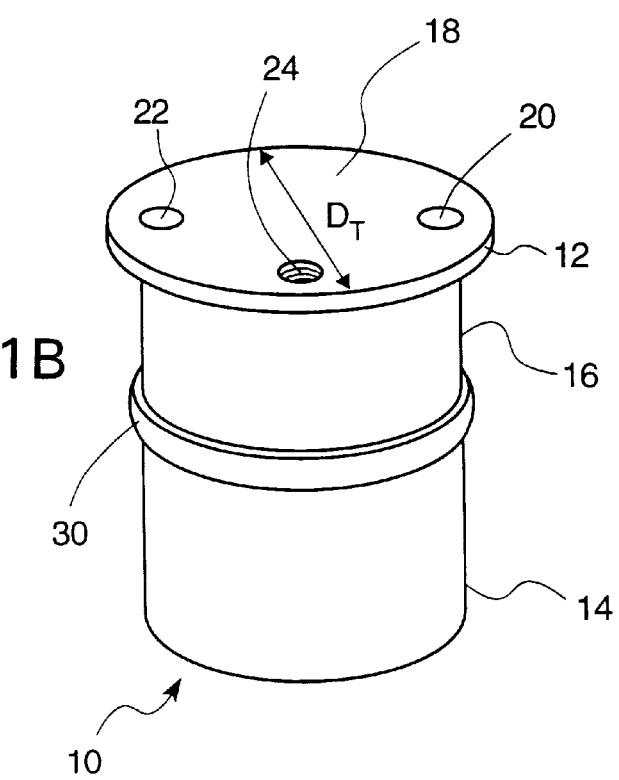

Referring to FIGS. 1A and 1B, a check valve module 10 includes a top end 12, a bottom end 14, and a sealing surface 16 between top end 12 and bottom end 14.

Top end 12 includes a top fluid communicating surface 18. Top surface 18 is generally flat, and has an inlet 20, an outlet 22, and a threaded alignment bore 24. Bottom end 14 includes a lower fluid communicating surface 26, and one-way check valves 28a, 28b. Sealing surface 16 is generally cylindrical in shape, and has an O-ring 30. Top surface 18 has a diameter $D_T$ of, e.g., about ¾ inches, and lower surface 26 has a diameter $D_L$ of, e.g., about ⅝ inches.

Figure 2:
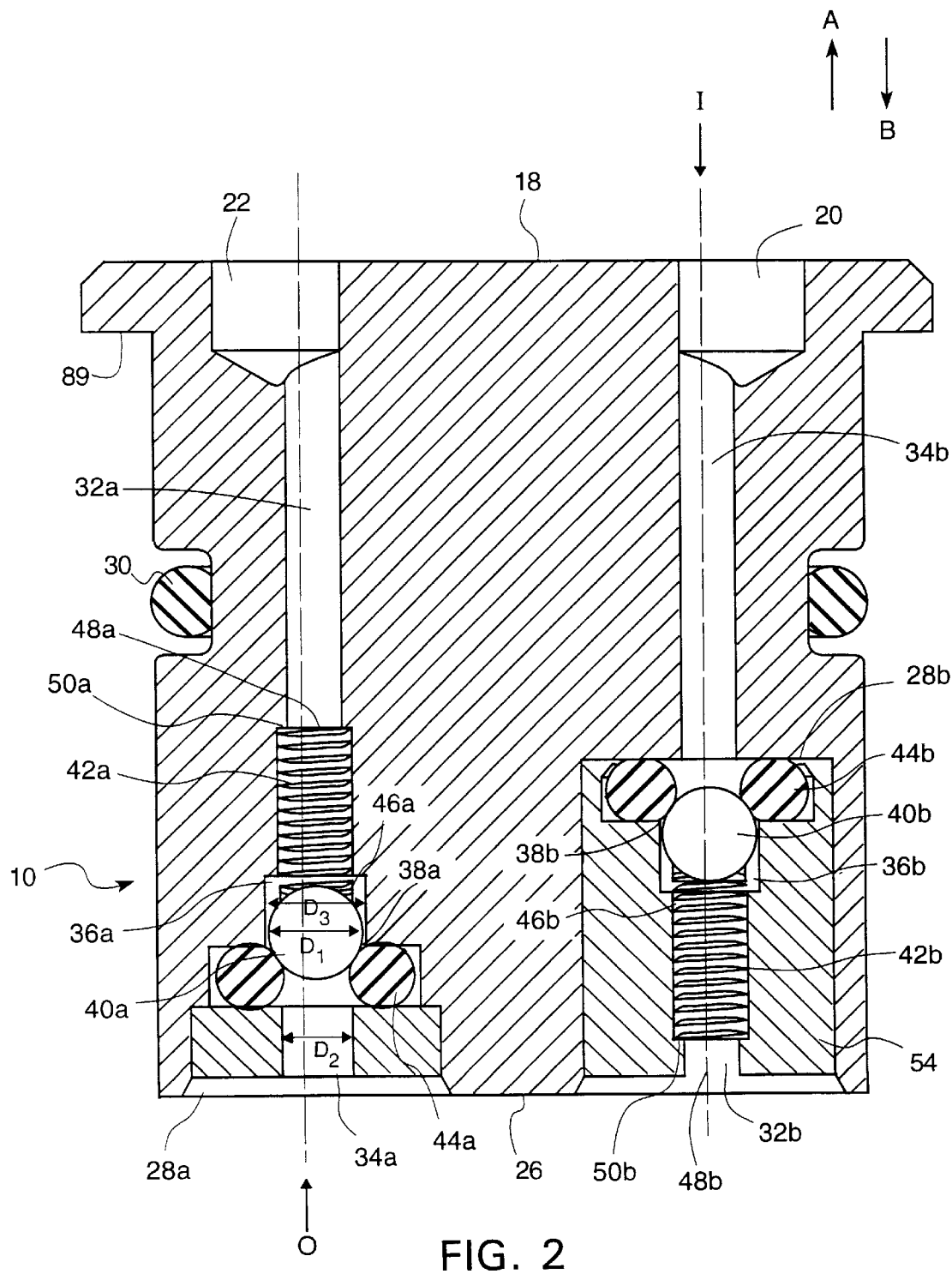
FIG. 2 is an sectional view of the check valve module of FIG. 1.

Referring to FIG. 2, check valve 28a includes a channel 32a, an upstream region 34a, a downstream region 36a, and a flow control structure 38a for preventing flow in the direction of arrow B, from downstream region 36a to upstream region 34a.

Flow control structure 38a includes a blocking ball 40a, a spring 42a, and an inner O-ring 44a. Blocking ball 40a has a diameter $D_1$ which is greater than a diameter $D_2$ of inner O-ring 44a, but less than a diameter $D_3$ of downstream region 36a. Ball 40a engages a first end 46a of spring 42a. A second end 48a of spring 42a engages a shelf 50a within channel 32a.

Check valve 28a defines an output flow-through path O from an opening 37a (FIG. 1A) in lower surface 26, through upstream region 34a, past flow control structure 38a, through downstream region 36a, through channel 32a, and outlet 22.

In operation, flow control structure 38a prevents flow from downstream region 36a to upstream region 34a in the following manner. If fluid begins to flow in the direction of arrow B, from downstream region 36a towards upstream region 34a, the fluid will push ball 40a in the direction of arrow B. Ball 40a will compress inner O-ring 44a, forming a seal, and blocking further flow in the direction of arrow B.

Check valve 28b has a similar structure and operation. As with check valve 28a, check valve 28b has a channel 32b, an upstream region 34b, a downstream region 36b, and a flow control structure 38b for preventing flow in the direction of arrow A, from downstream region 36b to upstream region 34b. Check valve 28b is disposed within an insert 54 which can be placed within module 10 during assembly of module 10.

Flow control structure 38b includes a blocking ball 40b, a spring 42b, and an inner O-ring 44b. Blocking ball 40b, upstream region 34b, and downstream region 36b have dimensions similar to the dimensions of ball 40a, region 34a, and region 36a, respectively. As in flow control structure 38a, ball 40b engages a first end 46b of spring 42b, and a second end 48b of spring 42b engages a shelf 50b. Flow control structure 38b operates in the same manner as structure 38a, preventing flow in the direction of arrow A, from downstream region 36b to upstream region 34b.

Check valve 28b defines an input flow-through path I in the opposite direction as path O, from inlet 20, through upstream region 34b, past flow control structure 38b, through downstream region 36b, and out an opening 37b (FIG. 1A) in lower surface 26. Module 10, therefore, is capable of controlling the flow of fluid in two directions simultaneously.

Figure 3:
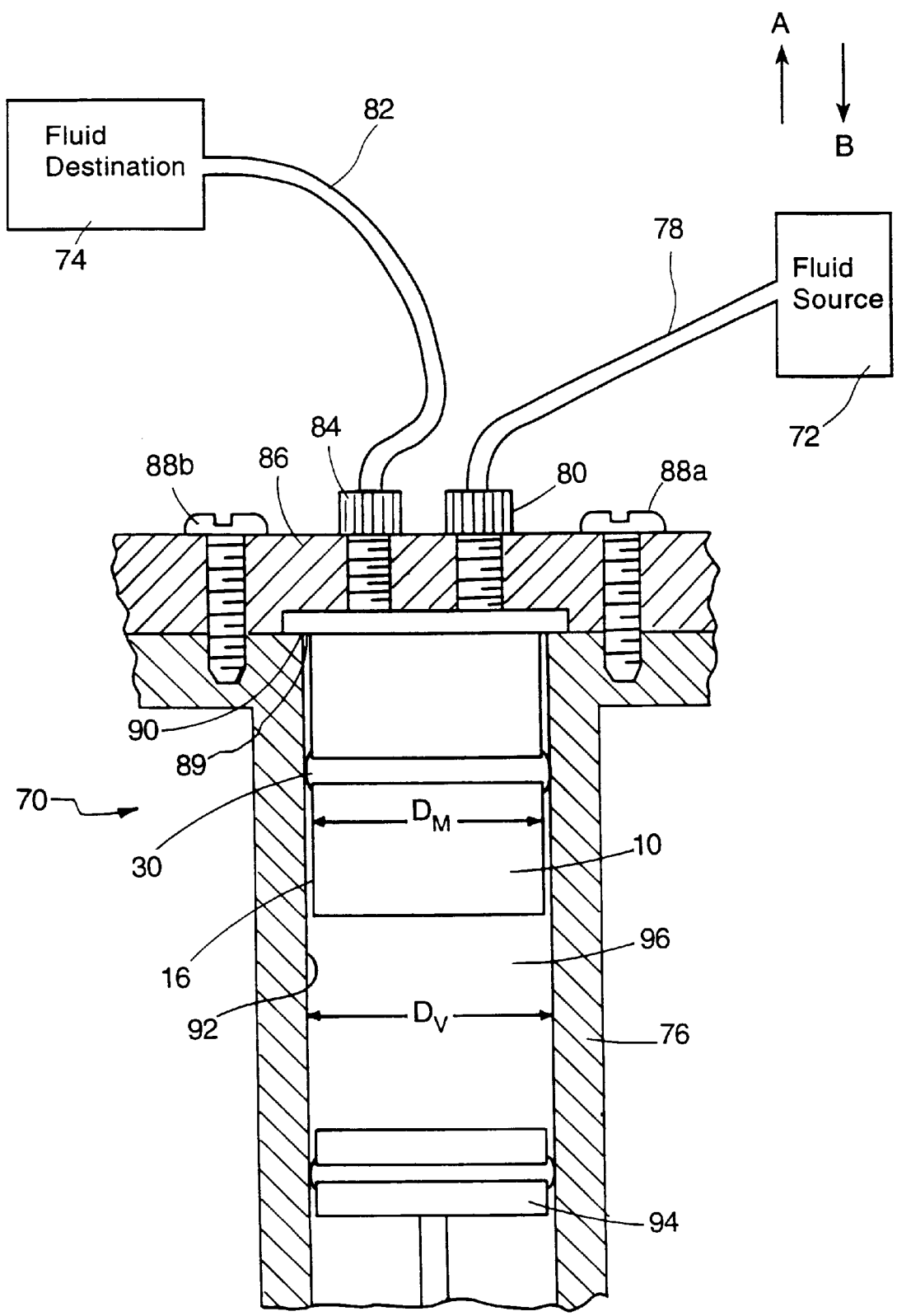
FIG. 3 is a partially schematic sectional view of the check valve module of FIG. 1 attached to a pump.
Figure 4:
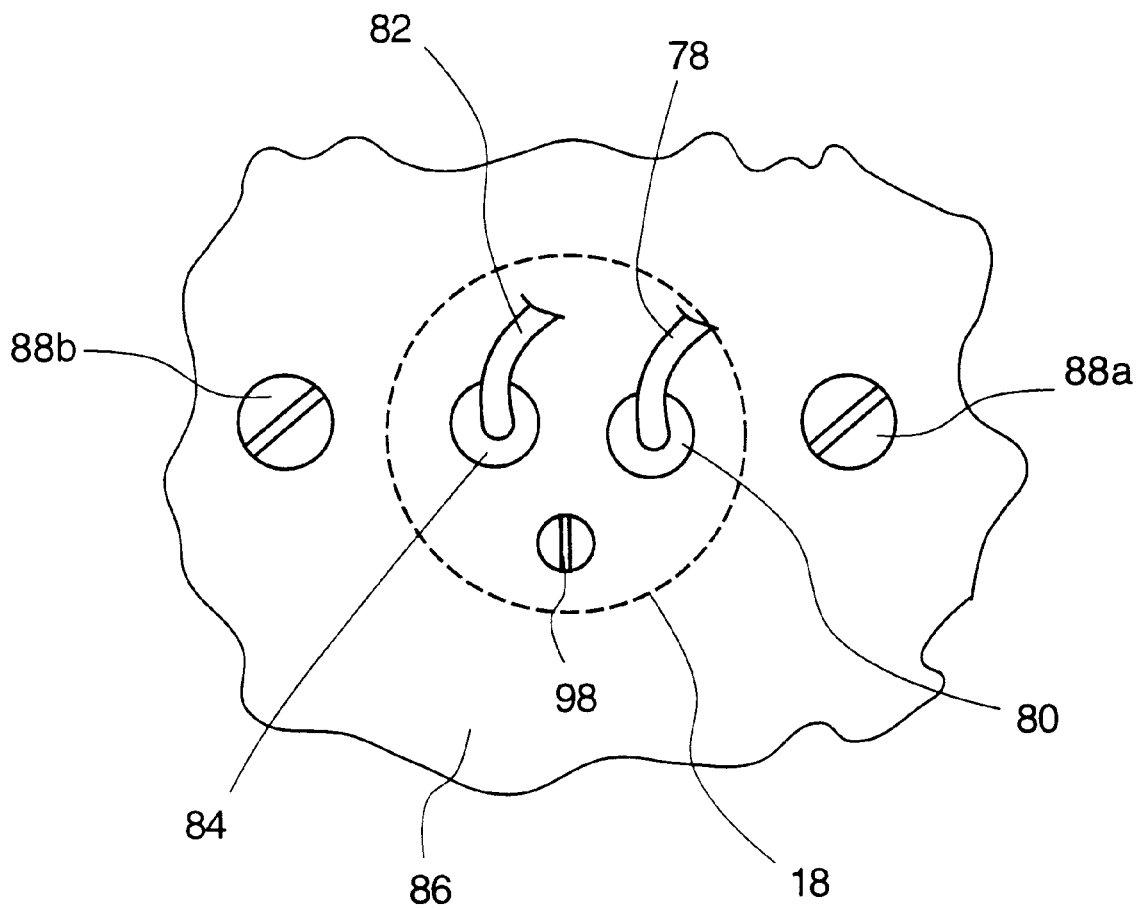
FIG. 4 is a plan view of the pump of FIG. 3.

FIGS. 3 and 4 illustrate a possible use for module 10 within a bi-directional flow-through assembly 70, e.g. a positive displacement pump. Assembly 70 includes a fluid source 72, a fluid destination 74, a piston cylinder 76, and module 10. Fluid destination 74 can be, e.g., a chromatography column, and fluid source 72 can be, e.g., a chromatography mobile phase solvent. Fluid source 72 connects to inlet 20 through an inflow tube 78 and an inflow connector 80, and fluid destination 74 connects to outlet 22 through an outflow tube 82 and an outflow connector 84. Connectors 80, 84 are pressed against top surface 18 around inlet 20 and outlet 22, respectively, by a connecting plate 86. Connecting plate 86 is attached to cylinder 76 by screws 88a, 88b. The structure and operation of connecting plate 86, and the method for connecting tubes 78, 82 to module 10 is described more fully in co-pending U.S. patent application Ser. No. 09/260,916, entitled "Fluid Coupling Assembly and Method," filed the same date as this application, and incorporated herein by reference in its entirety.

Cylinder 76 is cylindrical in shape, and has an inner diameter $D_V$ approximately equal to a diameter $D_M$ of module 10. Diameters $D_V$ and $D_M$ are both, e.g., about ⅝ inches. Since top surface 18 has a diameter $D_T$ greater than diameter $D_V$ of cylinder 76, top surface 18 rests above cylinder 76, and a lower lip 89 of top end 12 is pressed against an upper end 90 of cylinder 76 by connecting plate 86. O-ring 30 of sealing surface 16 seals module 10 to an inner wall 92 of cylinder 76. A piston 94 is disposed within cylinder 76, below lower surface 26 of module 10.

In operation, moving piston 94 in the direction of arrow B draws fluid from fluid source 72, through inflow tube 78, connector 80, and flow-through path I of module 10, and into chamber 96 of cylinder 76. Moving piston 94 in the direction of arrow A pushes fluid from chamber 96 through flow-through path O of module 10, and out connector 84 and tube 82, to fluid destination 74. Check valve module 10, therefore, allows fluid flow from source 72 to destination 74, without allowing any back-flow from destination 74 to source 72.

Assembly 10 can be used, e.g., for pumping fluid samples from a sample source to column chromatography cartridges, as described, for example, in U.S. patent application Ser. No. 09/260,915, entitled "Pump Drive Decoupler," filed the same date as this application, and U.S. patent application Ser. No. 09/264,846, entitled "Cartridge Sealing Apparatus and Method," also filed the same date as this application, both of which are incorporated herein by reference in their entirety.

Module 10 can be easily removed and replaced simply by removing bolts 88a and 88b and removing an orientation screw 98 (FIG. 4) received in threaded alignment bore 24.

Other embodiments are within the scope of the claims. For example, the dimensions of module 10 and cylinder 76 can be varied. Inlet 20 can have a different size or shape than outlet 22, to ensure that a user properly connects the fluid source and fluid destination to the correct openings. In addition, inlet 20 can be large in order to limit any drop in pressure experienced by liquids pulled into cylinder 76, in order to avoid degassing and cavitation.

The two check valves within module 10 can have structures other than flow controls structures 38a, 38b to control the flow of fluid through module 10. For example, module 10 might include flaps which allow flow only in one direction.

Assembly 70 can have a pumping mechanism other than a piston, e.g., a diaphragm.

What is claimed is:

1. A check valve module comprising:
   a body having a first fluid communicating surface and a second fluid communicating surface;
   two one-way check valves in said body controlling flow between said first and second surfaces, one said check valve permitting flow from said first surface to said second surface, and the other said valve permitting flow from said second surface to said first surface;
   an inlet and an outlet communicating with said first fluid communicating surface; and
   a registration structure for aligning said inlet with an input flow assembly, and said output with an output flow assembly, said registration structure being in fluid communication with and disposed on said first fluid communicating surface.

2. The module of claim 1, wherein said body further comprises a first end and a second end, and said first fluid communicating surface is on said first end, and said second fluid communicating surface is on said second end.

3. The module of claim 1, wherein said body comprises an outer sealing surface between said first and second fluid communicating surfaces.

4. The module of claim 3, wherein said outer sealing surface comprises a generally cylindrical shape.

5. The module of claim 4, wherein said cylindrical outer sealing surface comprises a sealing member.

6. The module of claim 5, wherein said sealing member comprises an O-ring.

7. The module of claim 1, wherein said first and second surfaces comprise a generally circular shape.

8. The module of claim 1, wherein said registration structure comprises a threaded bore.

9. The module of claim 8, wherein said first fluid communicating surface comprises a flat, circular surface, and said threaded bore is offset from said inlet and said outlet.

10. The module of claim 7, wherein a diameter of said first fluid communicating surface is greater than a diameter of said second fluid communicating surface.

11. The module of claim 1, wherein each said one-way check valve comprises a flow-through channel comprising:
   an upstream region;
   a downstream region;
   a blocking structure, said blocking structure permitting flow from said upstream region to said downstream region, but prohibiting flow from said downstream region to said upstream region.

12. The module of claim 11, wherein said flow channel further comprises a sealing structure, said sealing structure forming a seal with said blocking structure to prohibit flow from said downstream region to said upstream region.

13. The module of claim 12, wherein said sealing structure comprises an inner O-ring.

14. The module of claim 13, wherein said blocking structure comprises a ball disposed within said downstream region, said ball having a diameter greater than a diameter of said inner O-ring, but less than a width of said downstream region.

15. A check valve module comprising:
   a body having a first fluid communicating surface and a second fluid communicating surface; and
   two one-way check valves in said body controlling flow between said first and second surfaces, one said check valve permitting flow from said first surface to said second surface, and the other said valve permitting flow from said second surface to said first surface, wherein each said one-way check valve includes a flow-through channel that comprises:
      an upstream region;
      a downstream region;
      a sealing structure comprising an inner O-ring; and
      a blocking structure permitting flow from said upstream region to said downstream region, but prohibiting flow from said downstream region to said upstream region, said blocking structure comprising a ball disposed within said downstream region, said ball having a diameter greater than a diameter of said inner O-ring, but less than a width of said downstream region, wherein said ball forms a seal with said inner O-ring in the event of flow from said downstream region towards said upstream region.

16. A check valve module comprising:
   a body having a first fluid communicating surface and a second fluid communicating surface; and
   two one-way check valves in said body controlling flow between said first and second surfaces, one said check valve permitting flow from said first surface to said second surface, and the other said valve permitting flow from said second surface to said first surface, wherein each said one-way check valve includes a flow-through channel that comprises:
      an upstream region;
      a downstream region;
      a sealing structure comprising an inner O-ring; and
      a blocking structure permitting flow from said upstream region to said downstream region, but forming a seal with said inner O-ring to prohibit flow from said downstream region to said upstream region, said blocking structure comprising a ball disposed within said downstream region, said ball having a diameter greater than a diameter of said inner O-ring, but less than a width of said downstream region, wherein said blocking structure further comprises a spring, said spring biasing said ball towards said upstream region.

17. The module of claim 1, wherein said inlet is larger than said outlet.

18. A bi-directional flow-through assembly, said assembly comprising:
   a flow-through conduit having an inner wall and a two-way check valve module disposed within said conduit, said two-way check valve comprising:
      a body having a first fluid communicating surface, a second fluid communicating surface, and an outer sealing surface for sealing said body to said inner wall of said conduit;
      two one-way check valves in said body controlling flow between said first and second surfaces, one said valve permitting flow from said first surface to said second surface, and the other said valve permitting flow from said second surface to said first surface;
      an inlet and an outlet communicating with said first fluid communicating surface; and
      a registration structure for aligning said inlet with an input flow assembly, and said output with an output flow assembly, said registration structure being in fluid communication with and disposed on said first fluid communicating surface.

19. The assembly of claim 18, wherein said outer sealing surface of said body comprises an O-ring for forming a seal between said outer sealing surface and said inner wall of said conduit.

20. The assembly of claim 18, further comprising a piston disposed within said conduit for pumping fluid through said module.

21. The assembly of claim 18, wherein said first fluid communicating surface has a width greater than a width of said conduit, such that said first fluid communicating surface remains outside of said conduit when said module is disposed within said conduit.

22. The assembly of claim 18, further comprising a top plate, said top plate having a first fluid communicating end, and a second end for mating with said first surface of said check valve body.

23. The assembly of claim 22, wherein said top plate further comprises an inflow channel and an outflow channel for aligning with said inlet and said outlet respectively of said first fluid communicating surface of said body.

24. The assembly of claim 23, wherein said registration structure comprises a threaded bore, and said top plate further comprises a clearance hole for aligning with said threaded bore.

* * * * *